Sept. 1, 1925.

L. FEYERABEND

HORN OPERATING DEVICE

Filed Sept. 22, 1924

1,552,285

Patented Sept. 1, 1925.

1,552,285

UNITED STATES PATENT OFFICE.

LOUIS FEYERABEND, OF SEATTLE, WASHINGTON.

HORN-OPERATING DEVICE.

Application filed September 22, 1924. Serial No. 739,140.

*To all whom it may concern:*

Be it known that I, LOUIS FEYERABEND, a citizen of the United States, residing at Seattle, in the county of King and State of Washington, have invented new and useful Improvements in Horn-Operating Devices, of which the following is a specification.

This invention relates to horn operating devices for automobiles, an object being to provide means which may be readily attached to the steering column of an automobile to provide convenient means for operating the horn button without requiring the driver to remove either of his hands from the steering wheel.

Another object of the invention is the provision of a device of this character which may be easily attached in place and which will be held against objectionable rattling by the use of the horn button spring.

With the above and other objects in view, the invention further includes the following novel features and details of construction, to be hereinafter more fully described, illustrated in the accompanying drawings and pointed out in the appended claim.

In the drawings:—

Figure 1:
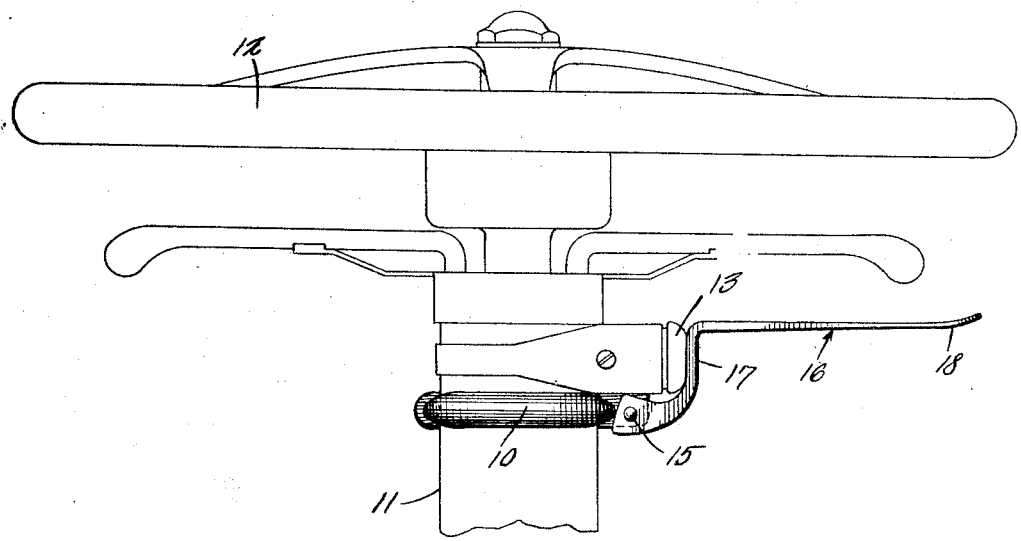
Figure 1 is an elevation of a portion of the steering column of an automobile with the invention applied.
Figure 2:
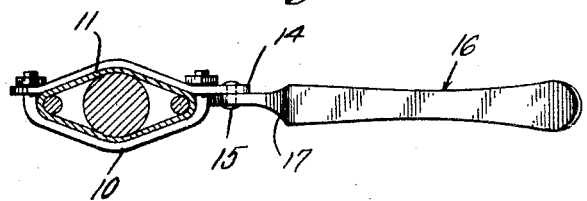
Figure 2 is a transverse sectional view of the same with the invention shown in plan.
Figure 3:
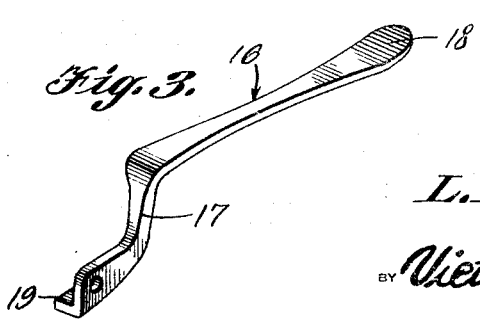
Figure 3 is a detail perspective view of the operating lever.

Referring to the drawings in detail wherein like characters of reference denote corresponding parts, the invention as shown comprises a clamp 10 which is adapted to be securely attached to the steering column 11 of an automobile, the steering wheel of which is shown at 12.

The device is designed for operating a horn button 13 which is attached to the steering column and extends laterally therefrom and the clamp 10 is designed to be secured around the column immediately below the button.

Extending from the clamp 10 is an apertured lug 14 and pivotally secured to this lug as shown at 15 is an operating lever 16. The lever is provided with an intermediate offset portion 17 and an outwardly disposed operating handle 18, the latter being disposed beneath the steering wheel 12 and immediately below the throttle lever.

The offset portion 18 is maintained in contact with the button 13 and to provide for this pivotal movement of the lever 16 in one direction is limited. For this purpose the inner end of the lever has extending laterally therefrom a lug 19 which extends transversely beneath the lug 14 and engages the lower edge of the latter so as to provide a stop. The usual spring of the button 13 forces the said button outward against the offset portion 17 of the lever 16 so that a positive contact between the button and lever is maintained, the pressure however being not sufficient to close the switch of the horn circuit. A slight upward movement of the outer end of the lever will however close the circuit and when upward pressure upon the lever is relieved the lever will fall by gravity so as to permit the button to move outward and open the switch.

The invention is susceptible of various changes in its form, proportions and minor details of construction and the right is herein reserved to make such changes as properly fall within the scope of the appended claim.

Having described the invention what is claimed is:—

A device for controlling an automobile horn comprising in combination with a horn button mounted upon the side of the steering column, a clamp secured upon the column, a lug extending from the clamp, a lever pivotally secured to the lug and extending laterally from the clamp, an offset portion provided in the lever for contact with the button and a lug extending laterally from the lever and engaging the clamp lug to limit movement of the lever in one direction.

In testimony whereof I affix my signature.

LOUIS FEYERABEND.